US009612944B2

(12) United States Patent
Augustine et al.

(10) Patent No.: US 9,612,944 B2
(45) Date of Patent: Apr. 4, 2017

(54) METHOD AND SYSTEM FOR VERIFYING SCENARIO BASED TEST SELECTION, EXECUTION AND REPORTING

(71) Applicant: TATA CONSULTANCY SERVICES LIMITED, Mumbai (IN)

(72) Inventors: Nisha A. Augustine, Chennai (IN); Bhanu R, Chennai (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 151 days.

(21) Appl. No.: 14/489,441

(22) Filed: Sep. 17, 2014

(65) Prior Publication Data
US 2015/0082287 A1 Mar. 19, 2015

(30) Foreign Application Priority Data
Sep. 18, 2013 (IN) .......................... 3023/MUM/2013

(51) Int. Cl.
G06F 9/44 (2006.01)
G06F 11/36 (2006.01)

(52) U.S. Cl.
CPC ................ *G06F 11/3688* (2013.01)

(58) Field of Classification Search
CPC ................................... G06F 11/3688
USPC .................................. 717/124–167
See application file for complete search history.

(56) References Cited

U.S. PATENT DOCUMENTS

| 7,039,899 | B1 * | 5/2006 | Quiroga | G06F 11/3684 714/E11.207 |
| 7,664,989 | B2 * | 2/2010 | Joshi | G06F 11/3688 714/38.14 |
| 7,685,576 | B2 * | 3/2010 | Hartmann | G06F 11/3688 717/105 |
| 7,895,565 | B1 * | 2/2011 | Hudgons | G06F 11/3684 717/106 |
| 2008/0184206 | A1 * | 7/2008 | Vikutan | G06F 11/3688 717/127 |

(Continued)

OTHER PUBLICATIONS

Biswal, Baikuntha Narayan, Pragyan Nanda, and Durga Prassad Mohapatra. "A novel approach for scenario-based test case generation." Information Technology, 2008. ICIT'08. International Conference on. IEEE, 2008. pp. 244-247.*

(Continued)

*Primary Examiner* — Satish Rampuria
(74) *Attorney, Agent, or Firm* — Blakely, Sokoloff, Taylor & Zafman LLP

(57) ABSTRACT

The present subject matter relates to software testing. The method comprises obtaining user requirements from a user, the user requirements being indicative of functionalities and features to be incorporated in a software application. Based on the user requirements, at least one test scenario for testing the software application may be identified. The at least one test scenario may include at least one step. Further, based on a first approval received from the user, one or more test cases may be associated with each step of the software application. The first approval is indicative of validity of the at least one test scenario. The one or more test cases may be executed for testing the software, based on a second approval received from the user. The second approval is indicative of validity of the one or more test cases.

11 Claims, 2 Drawing Sheets

(56) References Cited

U.S. PATENT DOCUMENTS

| | | | | |
|---|---|---|---|---|
| 2009/0313606 A1* | 12/2009 | Geppert | ............ | G06F 11/3692 |
| | | | | 717/124 |
| 2010/0064282 A1* | 3/2010 | Triou | ................ | G06F 11/3696 |
| | | | | 717/125 |
| 2011/0202901 A1* | 8/2011 | Givoni | ............... | G06F 11/3414 |
| | | | | 717/125 |
| 2013/0185056 A1* | 7/2013 | Ingram | .............. | G06F 11/3684 |
| | | | | 704/9 |

OTHER PUBLICATIONS

Tsai, Wei-Tek, et al. "Scenario-based functional regression testing." Computer Software and Applications Conference, 2001. COMPSAC 2001. 25th Annual International. IEEE, 2001. pp. 496-501.*

Tsai, Wei-Tek, et al. "Adaptive scenario-based object-oriented test frameworks for testing embedded systems." Computer Software and Applications Conference, 2002. COMPSAC 2002. Proceedings. 26th Annual International. IEEE, 2002. pp. 1-6.*

"SpiraTest—Product Information: Requirements, Test Management and Defect Tracking in One Package", Inflectra Corporation, 57 pages, (2013).

\* cited by examiner

METHOD AND SYSTEM FOR VERIFYING SCENARIO BASED TEST SELECTION, EXECUTION AND REPORTING

TECHNICAL FIELD

The present subject matter, in general, relates to test designing and, in particular, relates to method(s) and system(s) for scenario based test designing.

BACKGROUND

In the last few decades, information technology (IT) has become an integral part of the business operations in various industries, such as electronics, semiconductors, internet, telecom equipments, e-commerce, advertising, health care, hospitality, marketing, real estate, and computer services. As is generally understood, IT relates to the implementation of software-based applications for providing functionalities to computing systems allowing organizations to work more efficiently and to offer various services to users. However, to ensure that the software applications meet their objectives, the software applications have to be appropriately designed and rigorously tested. As would be known, software designing relates to creating specifications of software applications in order to accomplish predefined goals, based on a set of predefined parameters. Testing of a software application may be understood as using the software application in a simulated environment with specific input data and comparing an expected output with an actual output data. The comparison may assist in evaluating the performance of the software application.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
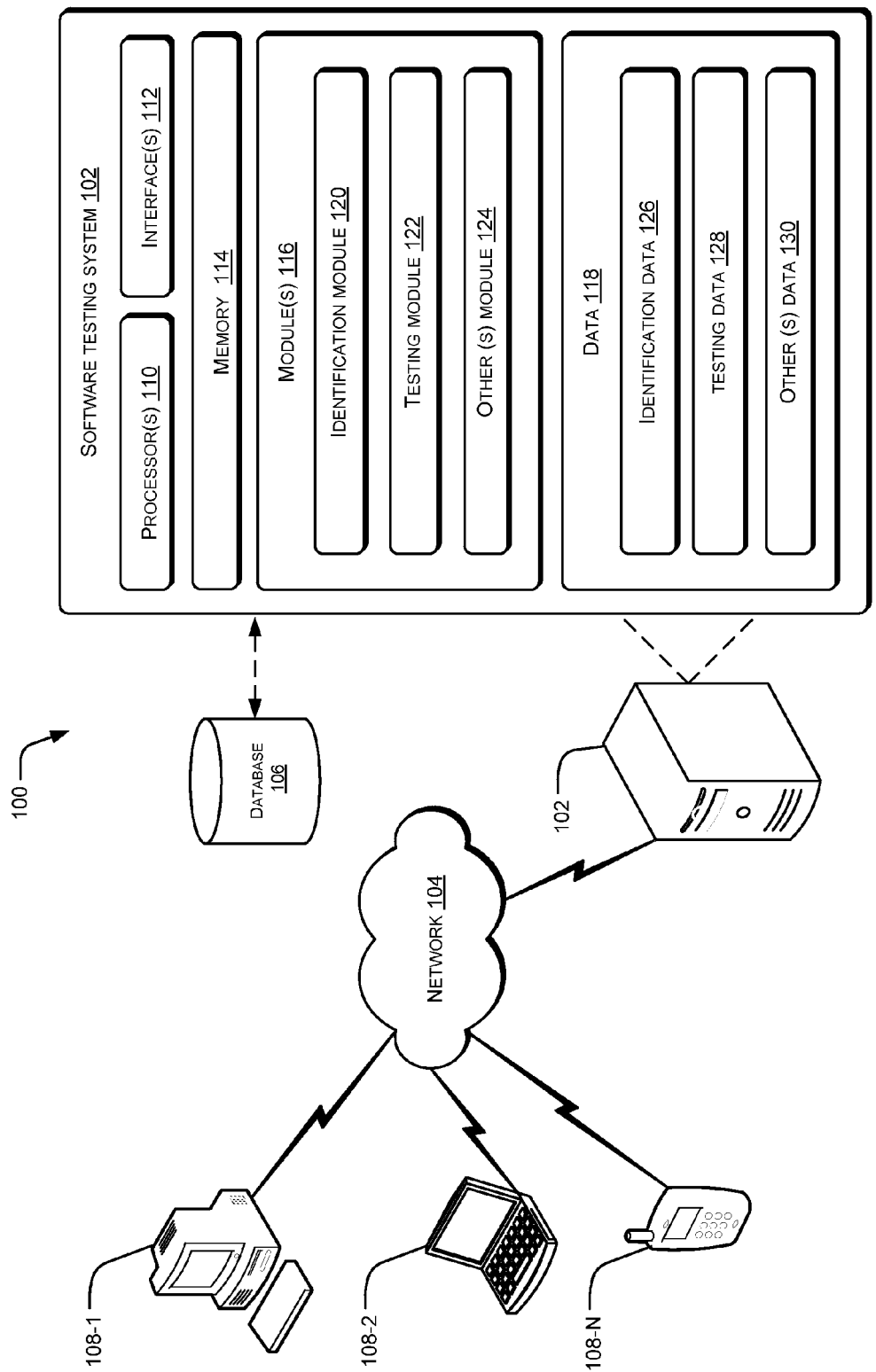
FIG. 1 illustrates a network environment implementing a software testing system, in accordance with an embodiment of the present subject matter.

System(s) and method(s) for scenario based software testing are provided. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In recent times, IT has shown remarkable progress in terms of the various applications for which it can be used. Today, computing devices are being increasingly used in industries, such as aerospace, automotive, biotechnology, education, semiconductors, entertainment, and health care. Generally, computing devices execute software-based applications to provide various functionalities, based on requirements of the organization where the computing devices are installed.

Nowadays, for design and development of a software application, organizations are investing considerable resources. However, due to complexities involved in software application designing, even after carefully designing the software application, the possibility of defects being present in the software application may remain. In the context of software application designing, such defects are commonly referred to as bugs. In some cases, the impact of such bugs may be high, and may result in severe consequences to the operations of the organization. In case of software products employed in traffic control systems or hospitals, any irregularity in operation of the software product may even result in loss of life. On the other hand, the organization responsible for designing such software products may experience irreparable damage to their reputation in the market.

To avoid such circumstances, software development organizations perform testing of the software applications before launching them in the market. As would be known, software testing is performed to verify and validate whether a software is developed in compliance with user requirements or not. A user may include, but is not limited to a developer of the software application, a stakeholder, a client and any person involved in the designing of the software application in any way. In other words, software testing detects irregularities in the functioning of the software application and therefore, assists in ensuring a quality product.

Generally, a tester may receive a set of requirements from the user for testing a software application. The tester may be understood as a person appointed for testing the software application. Once the requirements are received, the tester may test the software application in accordance to the requirements. Further, based on the testing, a final report may be provided to the user. For this, the tester may have to think of at least one test scenario. A test scenario may be understood as a hypothetical use case to help the tester to work through a complex problem or test system. This is typically done offline and it depends on the skill of the tester as to whether various relevant test scenarios are thought of or not. The tester may then create a plurality of test cases for the at least one test scenario for testing the software application. A test case may be understood as a set of conditions or variables under which the tester may determine whether the software application or one of its features is working as expected. The test cases may then be grouped to re-create the different test scenarios in the system for the purpose of testing. The test scenario thus created may include multiple test cases and a pre-defined sequence to be followed for execution of the multiple test cases.

Therefore, as would be gathered, even after identification of the at least one test scenario, the existing software testing techniques would not allow the tester to create the at least one test scenario in the system, and the plurality of test cases may have to be created first and then re-grouped to form the test scenarios. This approach demands significant amount of time as the at least one test scenario is created twice, once by the tester and then in the system. Moreover, there exists a possibility that the tester may not be able to cover all the user requirements and may end-up neglecting certain test scenarios. This may further result into inaccuracy of the software testing, various revisions, and therefore, customer dissatisfaction.

Further, in cases, when the tester may be unable to identify a cause of failure of a functionality of a feature, the plurality of test cases may be revised and re-executed until a favorable result is not achieved, i.e., the cause of the failure of the feature is not detected. Therefore, the number of test cases involved in software testing is substantially large and may pose inconvenience in monitoring and tracking the software testing on the basis of the test cases. As the number of test cases and revisions thereof is large, the number of test scenarios may also be large. As a result, establishing and maintaining traceability between the user requirements the test scenarios, the test cases, and the corresponding defects may become a challenge. Also, due to such a fragmented approach, the tester may have to spend a significant amount of time in monitoring and tracking the software testing at various stages, which may be inconvenient for the tester.

In addition, due to the complexity and the large number of steps involved in software testing, there exists a possibility of a communication gap between the tester and the user. In other words, due to miscommunication and complexities involved in the testing, the tester may deviate from an objective of the software testing. In such cases, accuracy and reliability of the software testing may be compromised. Further, the tester and the user may end up wasting significant efforts and resources without getting a desired outcome. Therefore, as would be gathered, the existing techniques of software testing are unreliable, complex, unstructured, fragmented, and inefficient.

According to the present subject matter, a software testing system, hereinafter referred to as system, for testing software-based applications is provided. In one implementation, the system may obtain user requirements from a user. The user requirements may be understood as functionalities and features that the user would like to incorporate in a software application. The present subject matter includes identification of test scenarios based on the user requirements, and then associating test cases with each of the test scenarios. Accordingly, based on the user requirements, at least one test scenario is identified for testing the software application. The at least one test scenario may include at least one step, and based on a first approval received from the user, one or more test cases may be associated with each step. The first approval is indicative of validity of the at least one test scenario. Further, upon receiving a second approval from the user, the one or more test cases may be executed for testing the software. The second approval is indicative of validity of the one or more test cases.

As mentioned previously, based on the user requirements obtained from the user, the at least one test scenario may be created. The user may include at least one of a developer of the software application, a stakeholder, a client and any person involved in designing of the software application. In one example, the user may provide a requirement of testing the functionality of a "login" feature of an online portal. In this case, a scenario of "Checking functionality of the 'login' feature" may be created. The at least one test scenario may further include at least one step. Continuing with the present example, the at least one step may include but is not limited to, providing a user ID, providing a password, and clicking on a "submit" icon. The at least one step may be understood as temporal steps for progression of availing a functionality of a feature of the software application.

In one implementation, following the creation of the at least one test scenario, the at least one test scenario may be provided to the user for approval. The user may verify the validity of the at least one test scenario, and subsequently may provide the first approval to proceed with further stages of the software testing. In one implementation, the verification may include confirming if the at least one test scenario captures the functionalities of the software application, as desired by the user. In an implementation, when the user is not satisfied with the at least one test scenario, the user may not approve the at least one test scenario and provide suggestions to modify and improve the at least one test scenario to be in conformance with the user requirements.

Further, once the at least one test scenario is finalized, one or more test cases may be created and associated with the at least one step of the at least one scenario. In continuation to the abovementioned example, the one or more test cases may include, but are not limited to "Wrong email ID and correct password", "Correct email ID and wrong password", "Wrong email id and wrong password" and "Correct email ID and correct password". In one implementation, the at least one test scenario along with the associated one or more test cases may be provided to the user. Once the user is satisfied with the one or more test cases, the user may provide the second approval for continuing with the next stage of the software testing. As would be gathered, the at least one test scenario and the associated test cases may keep getting revised and modified until the user is not satisfied. Therefore, a continuous communication may be maintained between the tester and the user. As a result, scope of any ambiguity in understanding of the user requirements may be negated at initial stages of the software testing thereby avoiding any re-work later.

In one implementation, a unique ID may be allotted to each communication between the tester and the user. For example, a first version of the at least one test scenario shared with the user may be assigned a unique ID "1.1". Similarly, a second version of the at least one test scenario received from the user may be assigned a unique ID "1.2". Accordingly, different versions of the at least one test scenario may be documented for future reference. Similar documentation may be performed for different versions of the associated one or more test cases. Therefore, due to the documentation of various communications with unique IDs, tracking of the software testing at various stages may become convenient and simpler.

In one implementation, based on the second approval, a test plan may be prepared. The test plan may indicate a course of action to be followed for testing the software application. In other words, a test plan may document a strategy that may be opted for testing the software application. Therefore, the at least one test scenario and the at least one test case may be executed in accordance with the test plan. Continuing with the present implementation, following the execution of the at least one test scenario and the at least one test case, an evaluation report may be generated. The evaluation report may include, but is not limited to, the user requirements, various versions of the at least one test scenario, the corresponding one or more test cases and bugs.

As would be gathered, the present subject matter ensures consistent communication between the tester and the user. Also, the creation of test scenarios and the associating test cases may provide a comprehensive and structured approach for software testing. Further, allocation of a unique ID to each communication between the tester and the user may ensure a convenient and effective monitoring and tracking of the software testing. In addition, a time-saving technique of performing and monitoring of the software testing is achieved ensuring convenience to the user as well as the tester.

These and other advantages of the present subject matter would be described in greater detail in conjunction with the following figures. While aspects of described system(s) and method(s) for scenario based software designing can be implemented in any number of different computing systems, environments, and/or configurations, the embodiments are described in the context of the following exemplary system(s).

FIG. 1 illustrates a network environment 100 implementing a software testing system 102, also referred to as system 102, according to an embodiment of the present subject matter. In the network environment 100, the system 102 is connected to a network 104. Further, the system 102 is connected to a database 106. Additionally, the network environment 100 includes one or more user devices 108-1, 108-2 . . . 108-N, collectively referred to as user devices 108 and individually referred to as user device 108, connected to the network 104.

The system 102 can be implemented as any set of computing devices connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the user devices 108 through the network 104. Examples of the user devices 108 include, but are not limited to personal computers, desktop computers, smart phones, PDAs, and laptops. Communication links between the user devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the user devices 108. The network devices within the network 104 may interact with the system 102 and the user devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as a network 104, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal.

The system 102 also includes module(s) 116 and data 118. The module(s) 116 include routines, programs, objects, components, data structures, etc., which perform particular tasks or implement particular abstract data types. In one implementation, the module(s) 116 includes an identification module 120, a testing module 122, and other module(s) 124. The other module(s) 124 may include programs or coded instructions that supplement applications and functions of the system 102.

On the other hand, the data 118, inter alia serves as a repository for storing data processed, received, and generated by one or more of the module(s) 116. The data 118 includes, for example, identification data 126, testing data 128, and other data 130. The other data 130 includes data generated as a result of the execution of one or more modules in the module(s) 116.

In one implementation, the system 102 may test a software application for bugs and defects. The identification module 120 may receive user requirements. A user may be understood as a client, a stakeholder, a developer of the software application, and any person involved in the designing of the software application in any way. The user requirements may be indicative of functionalities and features that the user wishes to incorporate in the software application. Each feature of the software application may be incorporated to provide a corresponding functionality to the user. Therefore, the user may wish to check any feature or the functionality of any feature of the software application. In addition, the user requirements may include technical requirements of the software application. In an alternative implementation, the identification module 120 may provide, to the user, a requirement list enlisting various user requirements. The user may select, from the requirement list, at least one user requirement, and the system 102 may test the software application accordingly.

Once the user requirements may be received from the user, the identification module 120 may identify at least one test scenario for testing the software application. For example, the identification module 120 may receive a user requirement of verifying the functionality of a "language selection" feature of an online portal. Therefore, the identification module 120 may identify a test scenario of "Checking functionality of 'language-selection' feature". The at least one test scenario may further include one or more steps for execution. Continuing with the present example, the one or more steps may include, but are not limited to clicking on the "language selection" icon, selecting one of a plurality of languages available, and clicking a "submit" icon. In one implementation, the identification module 120 may store the corresponding data as the identification data 126.

Following the identification of the at least one test scenario, the testing module 122 may provide the at least one test scenario to the user. The user may validate the identification of the at least one test scenario. In other words, the user may provide a confirmation that the at least one test scenario conforms to the user requirements, i.e., captures the functionalities to be tested, as desired by the user. Subsequently, the testing module 122 may receive, from the user, a first approval indicative of user's permission to proceed with further stages of the software testing.

In one implementation, the user may not be satisfied with the at least one test scenario. In such an implementation, the user may not approve the at least one test scenario, and the testing module 122 may receive, from the user, suggestions to modify and improve the at least one test scenario to be in conformance with the user requirements. Upon receiving the suggestions, the testing module 122 may revise the at least one test scenario, and may provide the revised test scenario to the user. Once the user is satisfied, the testing module 122 may receive the first approval from the user.

Upon receiving the first approval, the testing module 122 may create and associate one or more test cases with each step of the at least one test scenario. Further, the testing module 122 may provide the at least one test scenario along with the associated one or more test cases to the user. The user may confirm the validation of the one or more test cases, and may provide a second approval accordingly. In one implementation, when the user is not satisfied with the one or more test cases, the testing module 122 may receive suggestions from the user for modifying the one or more test cases. Based on the suggestions, the testing module 122 may revise the one or more test cases, and may seek approval for the same. Therefore, the testing module 122, based on the user's suggestions, may keep revising the one or more test cases, until the user is satisfied and provides the second approval.

In one implementation, the testing module 122 may allot a unique ID to each communication between the system 102 and the user. For example, the testing module 122 may assign a unique ID "0.1" to a first version of a test case shared with the user. Further, a second version of the test case received from the user may be assigned a unique ID "0.2". Similarly, a third version of the test case revised on the basis of user's suggestions may be assigned a unique ID "0.3". Further, once the test case is approved, a final version of the test case may be assigned a unique ID "1.0". The at least one test scenarios can also be documented in same manner. Therefore, by providing unique IDs to each communication occurring during the software testing, the system 102 may ensure a convenient tracking and monitoring of the software testing.

In one implementation, upon receiving the second approval, the testing module 122 may generate a test plan. The test plan is indicative of a course of action to be followed for testing the software application. In other words, a test plan may document a strategy that may be opted for testing the software application. Therefore, the at least one test scenario may be executed in accordance to the test plan. In another implementation, the testing module 122 may allot the at least one test scenario to more than one tester, based on an expertise of each tester. Following the execution of the at least one test scenario with the associated one or more test cases, the testing module 122 may generate an evaluation report.

The evaluation report may include details pertaining to the testing of the software application. The details may include, but are not limited to the user requirements, the at least one test scenario with unique IDs, the at least one step of each test scenario, the one or more test cases associated with each step, parameters involved with each test case, bugs, and areas of improvement. In one implementation, the evaluation report may include suggestions and corrective measures for fixing each bug. The testing module 122 may further provide the evaluation report to the user. In one implementation, the testing module 122 may store the corresponding data as the testing data 128.

Therefore, the present subject matter facilitates in ensuring a consistent communication between the tester and the user. Also, a comprehensive and structured approach for software testing is adopted by creating the test scenarios and the associating corresponding test cases. Further, allocation of a unique ID to each communication between the tester and the user may ensure a convenient and effective monitoring and tracking of the software testing. In addition, a time-efficient technique of software testing is achieved ensuring convenience to the user and the tester.

Figure 2:
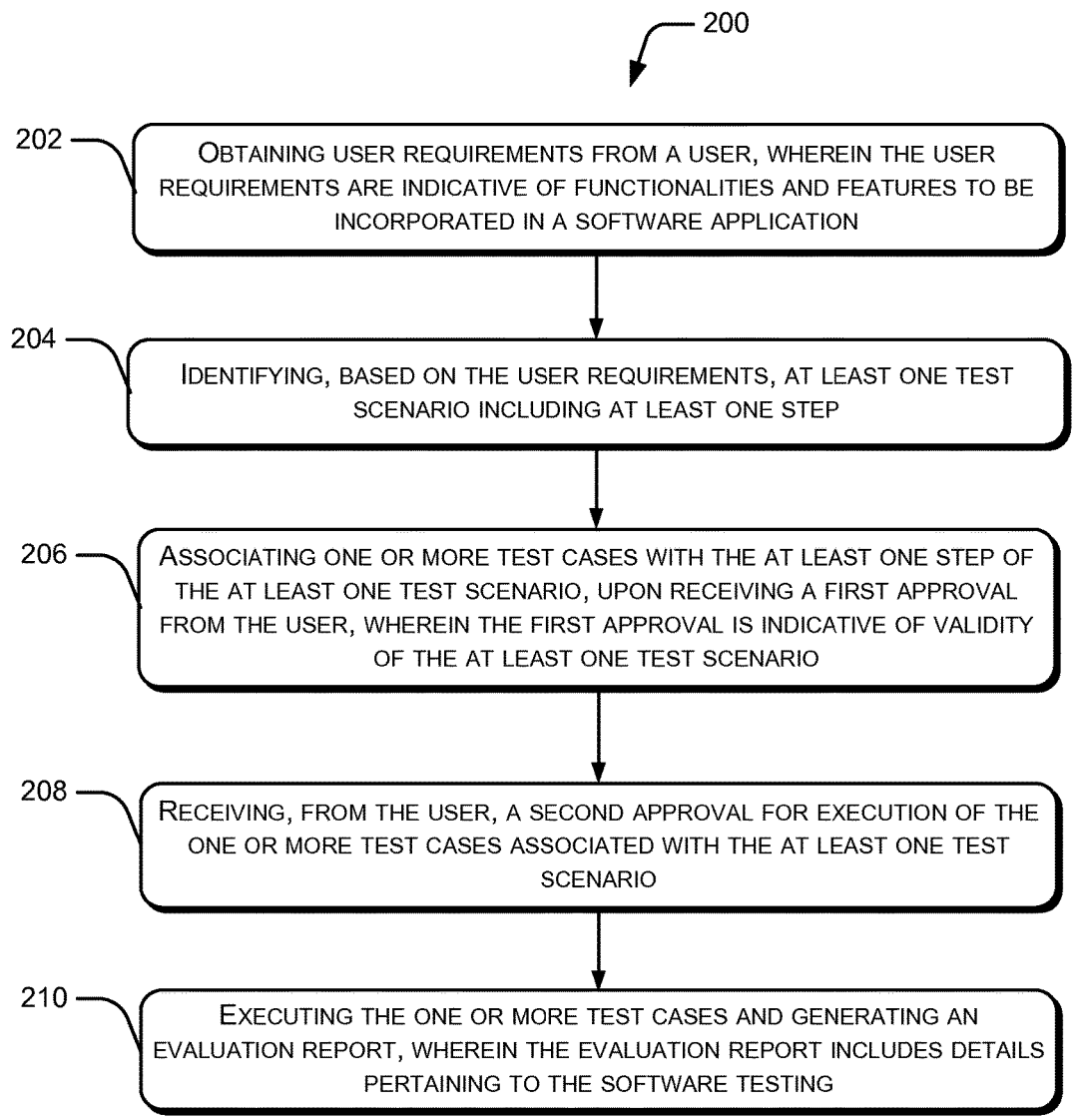
FIG. 2 illustrates a method for testing a software application, in accordance with an embodiment of the present subject matter.

FIG. 2 illustrates a method 200 for testing a software application, according to one embodiment of the present subject matter. The method 200 may be implemented in a variety of computing systems in several different ways. For example, the method 200, described herein, may be implemented using a software testing system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

At block 202, the method 200 may include obtaining at least one user requirement, for testing a software application for bugs and defects. The user requirements may be understood as functionalities and features that the user may expect from the software application. In one implementation, a requirement list may be provided to the user. The requirement list may enlist various user requirements for testing the software application. From the requirement list, the user may select at least one user requirement, and the software application may be tested accordingly. In one implementation, an identification module 120 of the system 102 may obtain the user requirements from the user.

At block 204, the method 200 may include identifying at least one test scenario for testing the software application, upon receiving the user requirements. For example, a user requirement of verifying the functionality of a "return to home page" feature of a user interface may be received. Therefore, a test scenario of "Checking functionality of a 'return to home page' feature" may be identified and created. The at least one test scenario may further include one or more steps for execution. The steps may be understood as temporal steps of progression for availing a functionality of a feature. In one implementation, the identification module 120 of the system 102 may identify the at least one test scenario.

At block 206, the method 200 may include providing the at least one test scenario to the user, upon identification thereof. The user may provide a confirmation that the at least one test scenario conforms to the user requirements, i.e., captures the functionalities to be tested, as desired by the user. In other words, the user may validate the identification of the at least one test scenario. Subsequently, a first approval may be received from the user. The first approval is indicative of user's permission to proceed with further stages of the software testing.

In one implementation, when the user may not be satisfied with the at least one test scenario, the user may not approve the at least one test scenario. In such an implementation, the user may provide suggestions to modify and improve the at least one test scenario to be in conformance with the user requirements. Upon receiving the suggestions, the at least one test scenario may be accordingly revised, and the revised at least one test scenario may be provided to the user for approval. Once the user is satisfied with the revision, the first approval may be obtained from the user.

Further, upon receiving the first approval, one or more test cases may be created and associated with each step of the at least one test scenario. Subsequently, the at least one test scenario along with the associated one or more test cases may be provided to the user. In one implementation, the testing module 122 of the system 102 may associate the one or more test cases with each step of the at least one test scenario, following the receipt of the first approval.

At block 208, the method 200 may include receiving a second approval from the user. The second approval is indicative of a validation of the one or more test cases. In one implementation, when the user is not satisfied with the one or more test cases, the user may provide suggestions for modifying the one or more test cases. Based on the suggestions, the one or more test cases may be revised, and shared with the user for the second approval. Therefore, based on the user's suggestions, the one or more test cases may keep getting revised, until the user is satisfied and provides the second approval.

In one implementation, a unique ID may be allotted to each communication occurring between a tester and the user. For example, a unique ID "0.1" may be allotted to a first version of a test scenario shared with the user. Further, a unique ID "02" may be allotted to a second version of the test scenario received from the user. Similarly, a unique ID "0.3" may be allotted to a third version of the test scenario revised on the basis of user's suggestions. The at least one test cases can also be documented in same manner. In one implementation, the testing module 122 of the system 102 may receive the second approval from the user.

At block 210, the method 200 may include generating a test plan upon receiving the second approval. The test plan is indicative of a course of action to be followed for testing the software application. Therefore, the at least one test scenario and, in turn, the one or more test cases may be executed in accordance to the test plan. In one implementation, the at least one test scenario may be allotted to more than one tester, based on an expertise of each tester. Further, once the one or more test cases are executed, an evaluation report may be generated and provided to the user.

In one implementation, the evaluation report may include details pertaining to the testing of the software application. The details may include, but are not limited to the user requirements, the at least one test scenario with unique IDs, the at least one step of each test scenario, the one or more test cases associated with each step, parameters involved with each test case, bugs, areas of improvement, and suggestions for fixing the bugs. In one implementation, the testing module 122 of the system 102 may execute the one or more test cases, and may generate the evaluation report.

Although implementations of a method for testing a software application have been described in language specific to structural features and/or methods, it is to be understood that the present subject matter is not necessarily limited to the specific features or methods described.

We claim:

1. A computer implemented method for testing a software application, the method comprising:
    obtaining, by a processor, user requirements, wherein the user requirements are indicative of functionalities and features to be incorporated in the software application;
    identifying, by the processor, based on the user requirements, at least one test scenario for testing the software application, the at least one test scenario includes at least one step, wherein the at least one step are temporal steps of progression;
    associating, by the processor, one or more test cases with the at least one step of the at least one test scenario upon receiving a first approval from a user, wherein the first approval is indicative of validity of the at least one test scenario;
    executing, by the processor, based on a second approval received from the user, the one or more test cases for testing the software application, wherein the second approval is indicative of validity of the one or more test cases; and
    generating, by the processor, an evaluation report comprising details pertaining to the software testing, wherein the details include the user requirements, different versions of the at least one test scenario with unique IDs, at least one step of each test scenario, one or more test cases associates with each step, a time stamp, parameters involved in each test case, bugs, corrective measures for fixing each bug and areas of improvement of the software application.

2. The method as claimed in claim 1 further comprising allocating a unique ID to each interaction between the user and a tester to track testing of the software application, wherein the interaction pertains to at least one of the user requirements, validation of the at least one test scenario, validation of the one or more test cases associated with the at least one test scenario, and the evaluation report.

3. The method as claimed in claim 1 further comprising modifying the at least one test scenario, based on inputs received from the user, wherein the user does not provide the first approval.

4. The method as claimed in claim 1 further comprising modifying the one or more test cases associated with the at least one step of the at least one test scenario, based on inputs received from the user, wherein the second approval is not received from the user.

5. A software testing system for testing a software application, the software testing system comprising:
a processor; and
a memory in communication with the processor, wherein the processor executes instructions within a plurality of modules stored in the memory, wherein the plurality of modules comprise:
an identification module, to,
obtain user requirements from a user, wherein the user requirements are indicative of functionalities and features to be incorporated in the software application; and
identify, based on the user requirements, at least one test scenario for testing the software application, the at least one test scenario includes at least one step, wherein the at least one step are temporal steps of progression; and
a testing module, to,
associate one or more test cases with the at least one step of the at least one test scenario upon receiving a first approval from the user, wherein the first approval is indicative of validity of the at least one test scenario;
execute, based on a second approval received from the user, the one or more test cases for testing the software application, wherein the second approval is indicative of validity of the one or more test cases; and
generate, by the processor, an evaluation report comprising details pertaining to the software testing, wherein the details include the user requirements, different versions of the at least one test scenario with unique IDs, at least one step of each test scenario, one or more test cases associates with each step, a time stamp, parameters involved in each test case, bugs, corrective measures for fixing each bug and areas of improvement of the software application.

6. The software testing system as claimed in claim 5, wherein the testing module further allocates a unique ID to each interaction between the user and a tester to track testing of the software application, wherein the interaction pertains to at least one of the user requirements, validation of the at least one test scenario, validation of the one or more test cases associated with the at least one test scenario, and the evaluation report.

7. The software testing system as claimed in claim 5, wherein the identification module further,
modifies the at least one test scenario, based on inputs received from the user, when the user does not provide the first approval; and
modifies the one or more test cases associated with the at least one test scenario, based on inputs received from the user, wherein the second approval is not received from the user.

8. A non-transitory computer-readable medium having embodied thereon a computer program for executing a method for testing a software application, the method comprising:
obtaining, by a processor, user requirements from a user, wherein the user requirements are indicative of functionalities and features to be incorporated in the software application;
identifying, by the processor, based on the user requirements, at least one test scenario for testing the software application, the at least one test scenario includes at least one step, wherein the at least one step are temporal steps of progression;
associating, by the processor, one or more test cases with the at least one step of the at least one test scenario upon receiving a first approval from the user, wherein the first approval is indicative of validity of the at least one test scenario;
executing, by the processor, based on a second approval received from the user, the one or more test cases for testing the software application, wherein the second approval is indicative of validity of the one or more test cases; and
generating, by the processor, an evaluation report comprising details pertaining to the software testing, wherein the details include the user requirements, different versions of the at least one test scenario with unique IDs, at least one step of each test scenario, one or more test cases associates with each step, a time stamp, parameters involved in each test case, bugs, corrective measures for fixing each bug and areas of improvement of the software application.

9. The non-transitory computer-readable medium as claimed in claim 8 further comprising allocating a unique ID to each interaction between the user and a tester to track testing of the software application, wherein the interaction pertains to at least one of the user requirements, validation of the at least one test scenario, validation of the one or more test cases associated with the at least one test scenario, and the evaluation report.

10. The non-transitory computer-readable medium as claimed in claim 8 further comprising modifying the at least one test scenario, based on inputs received from the user, wherein the user does not provide the first approval.

11. The non-transitory computer-readable medium as claimed in claim 8 further comprising modifying the one or more test cases associated with the at least one step of the at least one test scenario, based on inputs received from the user, wherein the second approval is not received from the user.

* * * * *